United States Patent [19]

Inoue et al.

[11] 4,286,819
[45] Sep. 1, 1981

[54] REAR SEAT FOR CARS

[75] Inventors: Haruo Inoue, Tokyo; Shigeru Yokota, Fujimi; Yoshiharu Saito, Wako, all of Japan

[73] Assignee: Honda Giken Kogyo Kabushiki Kaisha, Tokyo, Japan

[21] Appl. No.: 958,405

[22] Filed: Nov. 7, 1978

[30] Foreign Application Priority Data

| Nov. 7, 1977 [JP] | Japan | 52-149267 |
| Nov. 14, 1977 [JP] | Japan | 52-152524 |
| Nov. 14, 1977 [JP] | Japan | 52-152525 |

[51] Int. Cl.³ .............................................. B60N 1/02
[52] U.S. Cl. .................................. 296/65 R; 297/379
[58] Field of Search .......................... 296/63, 65 R, 69; 297/379, 378, 354, 355, 356, 363, 364, 365

[56] References Cited

U.S. PATENT DOCUMENTS

| 3,328,077 | 6/1967 | Krasinski | 297/379 |
| 3,719,379 | 3/1973 | Sigmund | 297/379 |
| 4,045,082 | 8/1977 | Egert et al. | 297/379 |
| 4,068,890 | 1/1978 | Kurozu et al. | 297/379 |
| 4,133,556 | 1/1979 | Glinski | 296/65 R |

Primary Examiner—Robert R. Song
Attorney, Agent, or Firm—Irbing M. Weiner; Pamela S. Burt; John L. Shortley

[57] ABSTRACT

A rear seat apparatus for cars which have a sitting space and a luggage space, the spaces communicating with each other but being normally substantially sectioned by a foldable rear seat back. In order to attain a comfortable position of the rear seat for occupants thereof, while also attaining variable capacity of the luggage space, a reclining device and an operating mechanism therefor is provided on the rear seat back. The operating mechanism is provided in the upper middle part of the back surface of the rear seat back for maximum operating convenience.

8 Claims, 12 Drawing Figures

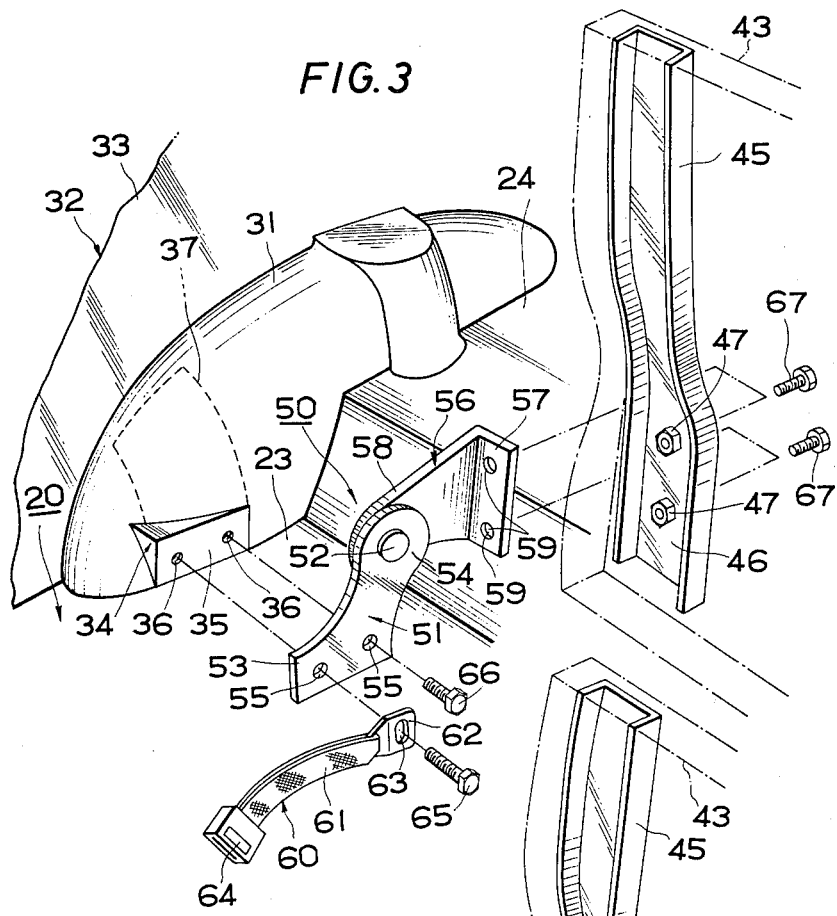
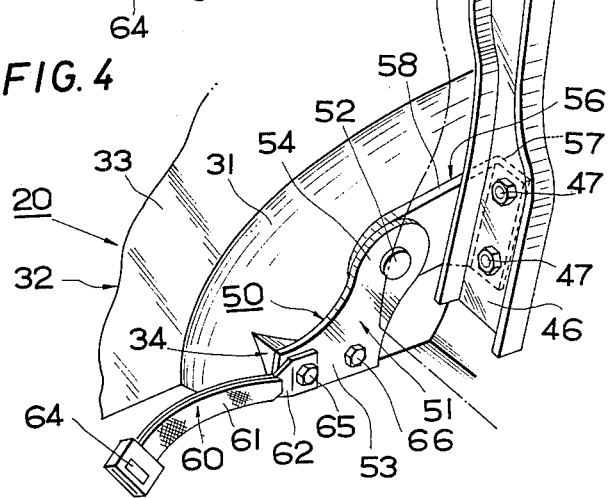

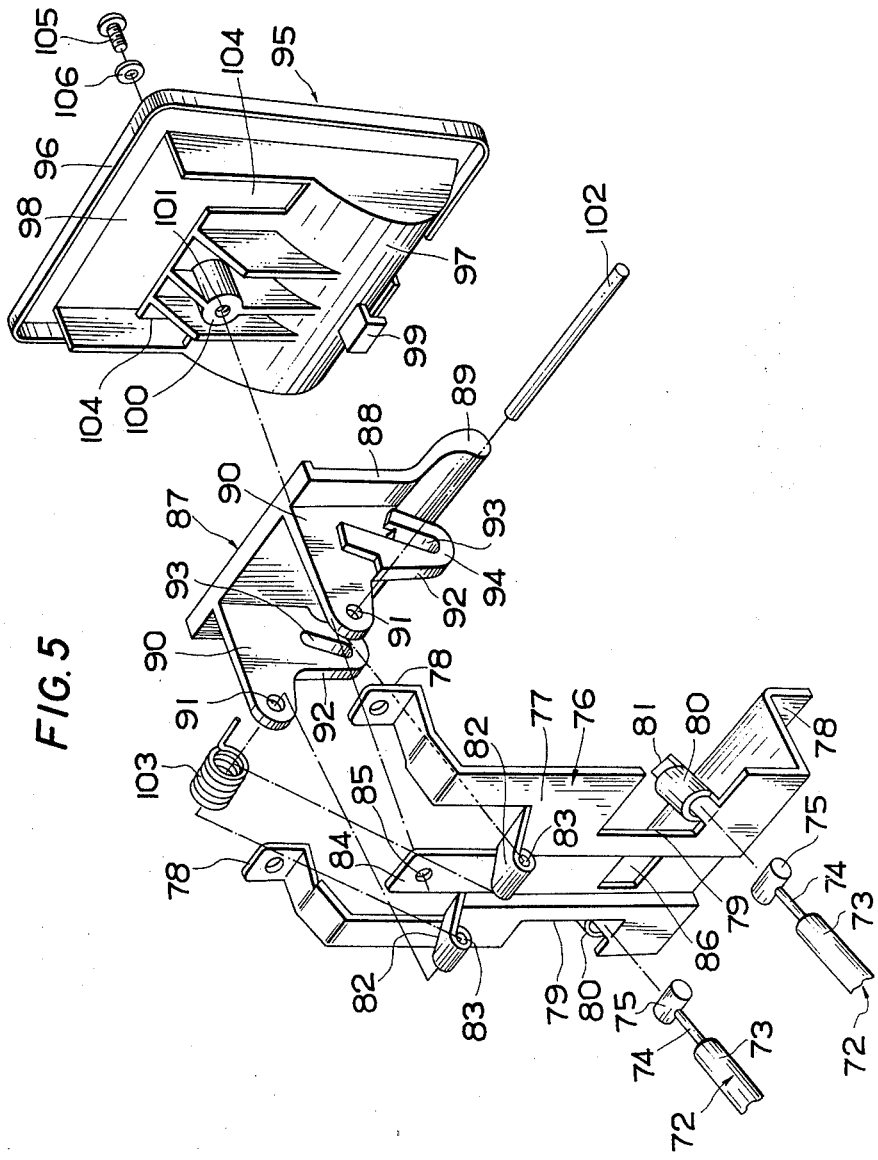

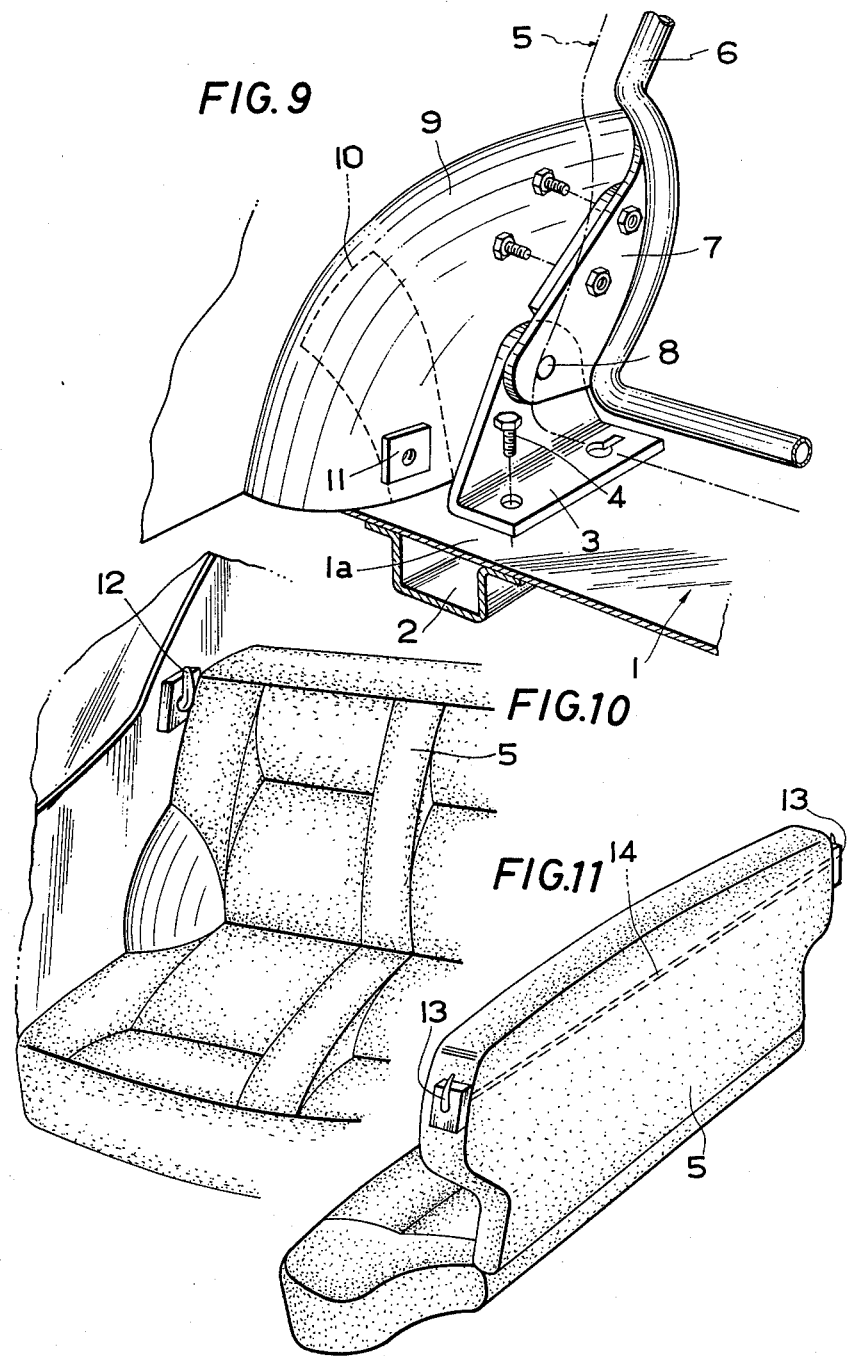

REAR SEAT FOR CARS

BACKGROUND OF THE INVENTION

1. Field of the Invention

The present invention relates to a rear seat apparatus for cars, and in particular to a rear seat having a seat back which sections the inside of the car into a sitting space and a luggage space provided with a tail gate door, with the two spaces communicating with each other.

2. Description of the Prior Art

Generally, the rear seat in a car is not provided with a reclining device such as often employed on the front seat of a car. There have been recently proposed some sedan type cars wherein the rising angle of the seat back of the rear seat is made adjustable. However, in the case of small-sized cars, the capacity of the luggage space necessarily becomes too small to be effectively used, because a free space is required between the seat back and the luggage space partition wall for adjusting the seat back rising angle.

In the field of small automobiles, there is known a car of a so-called hatch-back style or fast-back style wherein the luggage space is not entirely sectioned from the sitting space in the rear but is made to communicate therewith. A tail gate door is provided on the rear so as to be opened for putting luggage and/or other article(s) into and out of the luggage space, and the rear seat back is constructed to fall down forwardly to vary the capacity of the luggage space. In this type of car, the rear seat back is free to be folded but the rising angle thereof is not constructed to be adjustable. Because the seat back can only be moved to be either entirely raised or entirely lowered, even if it is possible to accommodate the luggage or other article(s) by minor adjusting of the inclination of the seat back, the seat back has to be made to entirely fall down, thereby eliminating any room for occupants in the rear seat.

Foldable rear seat backs have been conventionally equipped and supported as shown in FIG. 9. An L-shaped bracket 3 is fastened by a bolt 4 to a part 1a provided thereunder with a support 2, which is a longitudinally disposed member, on each side of a rear floor 1 inside of and between wheel houses 9, on which a rear cushion is mounted. An arm 7 provided at the lower end of each side of a pipe frame 6 of a rear seat back 5 is pivotably secured to bracket 3 by a pin 8. A reinforcing plate 10 is applied to the back surface of the rear wheel house 9 and a seat belt fitting member 11 is provided thereon.

Because such brackets 3 are positioned between the wheel houses 9, the distance between the right and left brackets 3 is short relative to the inside width of the car so that the lateral dimension of the entire seat back 5 is restricted. Further, because the brackets 3 are positioned between the wheel houses, effective utilization of the space around the wheel houses is not attained. A strict precision in the width direction of the rear seat is required in assembling the bracket 3 and member 7 so that assembly is made more difficult. In addition, in order to support the loads of the brackets 3 and the seat back 5 attached thereto, the conventional means requires reinforcement by supports 2, thus requiring additional members which are not essential to the frame structure and resulting in an increase of components, complication of the frame structure, and an increase in the weight of the car.

The operations for angular movement of the conventional rear seat back are shown in FIGS. 10 and 11. As shown in FIG. 10, there has been proposed a mechanism wherein an operating piece 12 is provided on the inner wall of the car body on one side of the rear seat back 5 or, as shown in FIG. 11, operating pieces 13 are provided directly on both side parts of the rear seat back 5 and connected with each other through a built-in rod 14 or the like.

However, in each of such conventional means, because the operating piece is provided in the very narrow space on the side of the seat back, operation is difficult and the operating mechanism is difficult to attach, resulting in assembly problems. Particularly, if the conventional means is applied to a car provided with a tail gate door, as in a hatch-back style, the operability from the rear will be very low.

The present invention provides a solution of the aforementioned problems caused by the conventional rear seat and its equipment, as well as its operation.

SUMMARY OF THE INVENTION

The present invention provides a rear seat apparatus for cars having a sitting space and a luggage space, which spaces communicate with each other and are normally substantially sectioned by a rear seat back foldable to vary the capacity of the luggage space. The rear seat back is provided with a reclining device so as to make the rising angle of the seat back adjustable, and means for operating the reclining device.

An object of the invention is to provide a rear seat for cars of a hatch-back style, wherein a comfortable sitting posture of a person sitting on the rear seat can be obtained and the rising angle of the rear seat back can be adjusted so that if the longitudinal dimension of the luggage is somewhat large but not so large as to require complete lowering of the seat back, the rising angle of the seat back may be slightly adjusted so as to permit the long luggage to be placed into the luggage space while ensuring use of the rear seat.

Another object of the invention is to provide a rear seat for cars, wherein the rear seat back is supported by first members provided on both sides of the seat back frame and second members on the body side, such as recliners pivoted to the first members. The body side members are directly attached inside the car to the lower ends of the inner walls of the rear wheel houses, without attaching them to the rear floor so that the space between the rear wheel houses inside the car may be fully utilized. A high fitting workability is thus obtained, which facilitates the manufacture and assembly of cars during mass-production.

A further object of the present invention is to provide a rear seat whereby necessary and sufficient strength and rigidity for supporting the body side members is obtained with simple structure resulting in less required reinforcement and component parts, and in lighter weight of the car body.

A still further object of the present invention is to provide a rear seat wherein an operating means is provided in the upper part on the back surface of the seat back to adjust the rising angle of the rear seat back, with easy operation.

The operating means includes an operating lever which is connected with ends of both right and left control cables, and is pivotably connected to a bracket fixed to the rear seat back so that the control cables may be pulled at equal distances by the operation of the lever to positively actuate the operating means, with minimal component parts and simple structure.

A preferred embodiment of the present invention is described hereinbelow in detail with reference to the accompanying drawings.

BRIEF DESCRIPTION OF THE DRAWINGS

FIG. 3 is an exploded view of a rear seat back supporting structure showing essential parts thereof.

FIG. 4 is a perspective view of the parts of FIG. 3, as assembled.

FIG. 5 is an exploded view of an embodiment of an operating means for providing a reclining operation.

FIG. 9 is a view showing a conventional structure for supporting a rear seat back.

FIG. 10 is an explanatory view of a conventional operating means.

FIG. 11 is an explanatory view of another conventional operating means.

DETAILED DESCRIPTION

Figure 1:
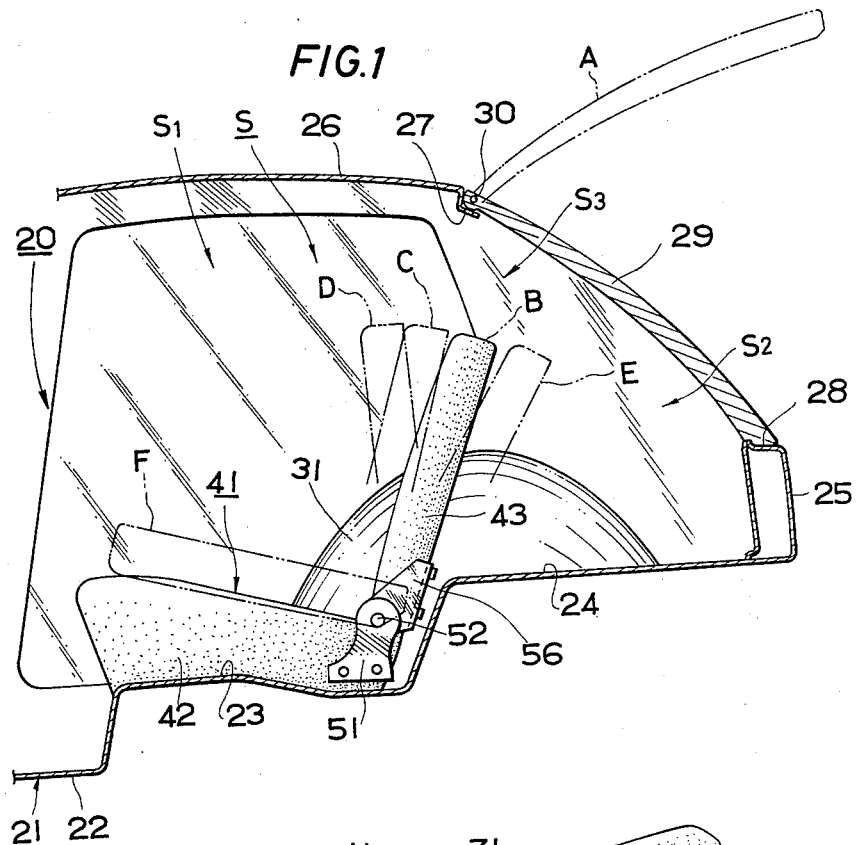
FIG. 1 is an explanatory vertically-sectioned side view of the rear part of a car of a hatch-back style.

Referring to FIG. 1, there is shown a car 20 of a hatchback style. A floor 21 of car 20 comprises a lowest floor portion 22, a rear seat floor portion 23 higher than floor portion 22, and a rear floor portion 24 still higher than floor portion 23. A back frame 25 is formed at the rear end of rear floor portion 24. An opening 28 is provided between back frame 25 and a rear end of a roof panel 26, the opening 28 extending forwardly relative to frame 25. A tail gate door 29 is provided to open and close opening 28, and is pivotably connected at the upper end 30 thereof to both sides of the upper end of opening 28. The fully opened position of door 29 is shown by a chain line A in FIG. 1.

A seat cushion 42 of a rear seat 41 is provided on rear seat floor portion 23. A seat back 43 is arranged to rise from the rear end of seat cushion 42 and is supported through recliners 51 on rear wheel houses 31 extending inwardly on both sides of seat cushion 42. Seat back 43 is foldable with respect to seat cushion 42 and is adjustable in the rising angle thereof. By adjustment of recliners 51, seat back 43 can be adjustably moved into four different positions such as, for example, forward positions C and D, a rearward position E, and an ordinary rising position B. These positions are selected by varying the rising angle of the rear seat back about a pivot 52. In the event rear seat back 43 is unlocked from the respective positions B through E, the back will fall down to overlap on seat cushion 42 as illustrated by a chain line F. In this position, the upwardly directed back surface of seat back 43 is so constructed as to form a substantially continued plane with rear floor portion 24.

The interior space S (FIG. 1) of the car is sectioned substantially by rear seat back 43 into sitting space S1 and a luggage space S2. Luggage space S2 and sitting space S1 communicate with each other through an upper space S3. When seat back 43 is entirely lowered down, sitting space S1 and luggage space S2 join together to form a single larger space.

Figure 2:
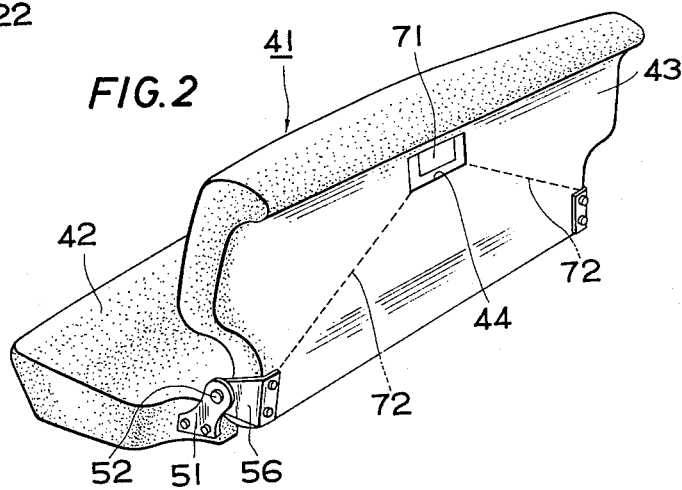
FIG. 2 is a perspective rear view of a rear seat.

The positions B through F of rear seat back 43 are made adjustably selectable by operating recliners 51. As shown in FIG. 2, a device 71 for operating recliners 51 is provided on the back surface of seat back 43, i.e., in a recess 44 provided in the upper part on the back surface of seat back 43, and is connected to right and left recliners 51 through control cables 72 so that the adjusting operation may be made by the operation of device 71. Operating device 71 is easily operated from the rear through opened gate 28 and can be operated also by being gripped by the fingers of a person sitting on the rear seat.

Thus, according to the invention, the rear seat back of cars of a hatch-back style is constructed not only to be foldable but also to be adjustable in the rising angle thereof by means of the recliners so that a comfortable sitting posture may be easily obtained. Further, because the rear seat back can be set in any selected position, particularly positions C and D, even if it is desired to store luggage and/or other articles somewhat larger than the normal longitudinal dimension of the luggage space it will not be necessary to entirely lower the seat back into its folded down position. Therefore, the capacity of the luggage space can be adjusted according to the luggage size and the limited space within the car can be effectively utilized.

The adjustable support of the rear seat back is described in detail hereinbelow with reference to FIGS. 3 and 4.

In FIG. 3, reference numeral 32 indicates the body of car 20. The rear wheel houses 31 are respectively symmetrically formed on side walls 33, adjacent to car floor portions 23 and 24, so as to extend inwardly within the car. A projecting portion 34 is integrally formed in the lowest part of rear wheel house 31 adjacent seat floor portion 23, during the shaping step of the rear wheel house. Projecting portion 34 includes a flat vertical surface 35 comprising a fitting seat. A reinforcing plate 37 is applied to the back side of projecting portion 34 in the rear wheel house. Two screw holes 36 are provided, and are spaced from each other in the longitudinal direction on flat surface 35 of projecting portion 34.

A supporting member 50 is provided for attaching seat back 43 to the car body side. Supporting member 50 includes recliner 51 on the body side and a bracket 56 on the seat back side. Recliner 51 is formed to have flat part 53 which includes two fitting holes 55 corresponding to holes 36, and is pivotably connected to bracket 56 by a pin 52 in the upwardly extended part 54. Bracket 56 includes a bent part 57 provided with two fitting holes 59, to be connected to the seat back, and is pivotably connected to recliner 51 by a pin 52 in the forwardly extended flat part 58.

Channel-shaped side members 45 of the seat back frame are arranged on both sides on the rear seat back, and are provided with flat fitting parts 46 in the lower portions thereof. Upper and lower nuts 47 are provided as fixed to fitting parts 46. In addition, half of a rear seat belt assembly 60 is provided, which comprises a belt 61, a fitting metal piece having a hole 63, and a buckle 64.

In assembling, recliner 51 of supporting member 50 pivoted with pin 52 is applied in flat part 53 thereof to flat surface 35 of projecting portion 34 of rear wheel house 31. Fitting holes 55 are fitted to screw holes 36 of surface 35 and bolts 65 and 66 are screwed into holes 36 through holes 55 to fasten recliner 51 to surface 35. Bolt 65 is passed through hole 63 of metal piece 62 to fasten seat belt mechanism 60 to recliner 51. Therefore, seat belt mechanism 60 requires no further fitting work other than the fitting work of recliner 51.

Bracket 56 of supporting member 50 is connected to side member 45 in such a manner that the inner surface of bent part 57 is applied to the outer surface of the flat part 46 and is fastened from the outer surface side with bolts 67 through fitting holes 59 to nuts 47.

Thus, recliner 51 is attached and seat back 43 is supported on the body side in the rear part of the interior of the car so as to be foldable and adjustable in the rising angle. The assembled state is shown in FIG. 4.

Because the side surface of rear wheel house 31 is thus utilized as a fitting portion for recliner 51, the assembly work to be performed under the seat is eliminated, and because the fitting work is made on the side surface, the work is simple and easy and the fitting workability is improved. Further, because recliner 51 is attached to the inner side wall of wheel house 31, it is easily adjusted in the width direction, and even if there is a dimensional error in this direction it will be able to be easily corrected. Most importantly, the space between the rear wheel houses can be effectively and favorably utilized by attaching supporting member 50, i.e., recliner 51, to the rear wheel house without a longitudinally-passed reinforcing member such as the conventional type supported on the chassis floor. Thus, the rear seat back can be supported with minimal reinforcement, simple frame structure, and a minimum number of frame forming members.

An operating device 71 for operating recliner 51 is described hereinbelow with reference to FIGS. 2 and 5-8.

Operating device 71 is attached in recess 44 provided in the upper central part on the back surface of seat back 43 and is provided with a bracket 76, which is a base member to be fixed to the seat back frame or the like. Bracket 76 is pressformed from a steel plate material and is provided with a plate body 77 as clearly shown in FIG. 5. Parts 78 to be screwed to the seat back frame or the like are provided at the upper and lower ends of plate body 77. Notches 79 are symmetrically formed by cutting off the middle parts of both lateral sides of body 77. Loops 80 are integrally formed on the lower edges of notches 79 so as to hold outer cables 73 of control cables 72. Stoppers 81 for regulating the ends of outer cables 73 are integrally provided at the respective rear ends of loop-shaped holding parts 80. Somewhat forwardly-inclined pieces 82 are extended out from the upper end of body 77. Journals 83 are formed by shaping the tips of these pieces 82 to be loop-shaped. A cover fitting hole 85 is formed in a vertically extended part 84 between pieces 82. A window-shaped locking hole 86 is formed below part 84 in the lower part of body 77.

An operating level 87 is provided with a body 88, and includes a somewhat curved finger operating part 89 extending rearwardly downwardly and arms 90 projecting forwardly on the rear surface of body 88. The arms 90 are provided with holes 91 at the front ends thereof, and with downwardly extending parts 92 having diagonal slots 93 and thickened parts 94 for reinforcing around the slots. Operating lever 87 is integrally made of a synthetic resin material.

A cover 95 is provided for shielding the internal mechanism of the operating device from outside. A body 96 of cover 95 is formed to be square frame-shaped and is provided with a partition plate 97, curved inwardly toward the back surface side, and an opening 98 above the partition plate. Partition plate 97 is provided with a stopper 99 on the back surface thereof, and a fitting boss 100 having a screw hole 101 disposed above the stopper. Cover 95 is integrally made of a synthetic resin material.

Bracket 76 is screwed through parts 78 into recess 44 on the back surface of rear seat back 43 as already described. The right and left cables 72 connected at one end thereof to recliners 51 on both sides of seat back 43 are led at the other ends thereof to bracket 76 through the interior of seat back 43. End parts of outer cables 73 of respective cables 72 are passed through loop-shaped holding parts 80. Engaging members 75 provided at the tip ends of respective inner cables 74 are projected out of the rear ends of holding parts 80. Outer cables 73 are regulated at the tips thereof by stoppers 81.

Arms 90 of lever 87 are so positioned as to hold journals 83. A supporting pin 102 is inserted through holes 91 and journals 83 from one side. A return spring 103 is placed on pin 102 from the other side. By such construction, lever 87 is resiliently pressed and supported to be rotatable, and is held in the position shown in FIG. 6. Engaging members 75 provided at the ends of inner cables 74 are inserted in and engaged with slots 93 of lever 87. Lever 87 is held vertically within bracket 76 by the tension of the inner cables 74. Reinforcing thickened parts 94 contact on the inner surfaces thereof with the outer surface of body 77 so as to function as stoppers. Body 88 contacts, on the upper surfaces at both side ends thereof, with the lower surface of part 78 of body 77 to function as stoppers when lever 87 is pulled.

Cover 95 is arranged on the outer surface of bracket 76. Body 88, including the finger operating part 89 of lever 87, is freely disposed in opening 98 of cover 95 so as to be exposed on the outer surface of cover 95. Vertical notches 104 are provided on both sides of partition plate 97 so as to ensure the motion of arms 90. Stopper 99 of partition plate 97 is engaged with locking hole 86 provided in bracket body 77. Fitting boss 100 is fastened to extended part 84 of body 77 by passing screw 105 through holes 101 and 85 through washer 106. Thereby, the internal mechanism of operating device 71 is shielded by cover 95, except for lever 87.

Figure 12:
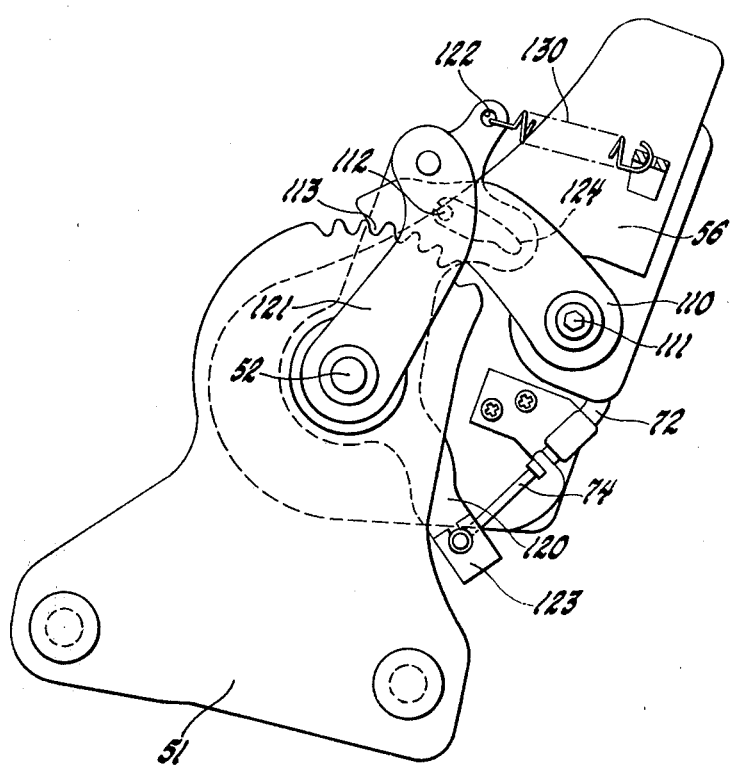
FIG. 12 is a view illustrating the cooperation between a control cable and a latching mechanism for the rear seat back.

With reference to FIG. 12, there is shown one possible exemplary latching mechanism arrangement operatively associated with recliner 51 and controlled by cable 72. The distal end of an inner cable 74 of control cable 72 is connected with the lower end 123 of a control lever 120, the control lever 120 being rotatably supported in an intermediate portion thereof by pivot pin 52 and being interposed between recliner 51 and bracket 56. A coil spring 130 is engaged at one end thereof with the upper end 122 of lever 120 and at the other end thereof with bracket 56, so as to thereby urge lever 120 in a clockwise direction. The lever 120 is provided in the portion thereof between pivot pin 52 and upper end 122 with a slot 124 extending in a sideways direction. A lever 121 disposed outside of recliner 51 and pivoted at pin 52 is connected at the upper end thereof to lever 120 so as to pivotally move together therewith. An arm 110 pivotally supported at 111 is provided at the free end thereof with teeth 113 which cooperate with teeth provided on the upper end of recliner 51 so as to adjust the rising angle of seat back 43. The arm 110 is further integrally provided with a pin 112 which is positioned within and engages with slot 124. With such arrangement, when cable 74 is pulled by means of operating lever 87, control lever 120 is turned in a counter-clockwise direction against the force of spring 130. Because slot 124 moves leftwardly together with lever 120, pin 112 is guided rightwardly along slot 124 so that arm 110 is moved upwardly away from recliner 51. When teeth 113 of arm 110 are disengaged from the teeth of recliner 51, bracket 56 and seat back 43 integrally affixed thereto will be free to angularly move about pivot 51, and can thus be moved to the desired angular position thereof.

Figure 6:
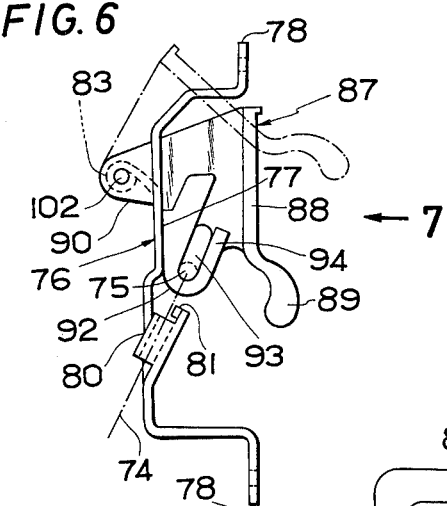
FIG. 6 is a side view of the operating means of FIG. 5, as assembled.
Figure 7:
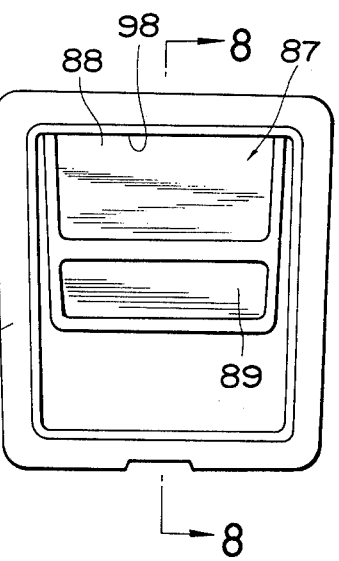
FIG. 7 is an elevational view of the operating means of FIG. 6 as seen from the direction indicated by arrow 7 in FIG. 6.
Figure 8:
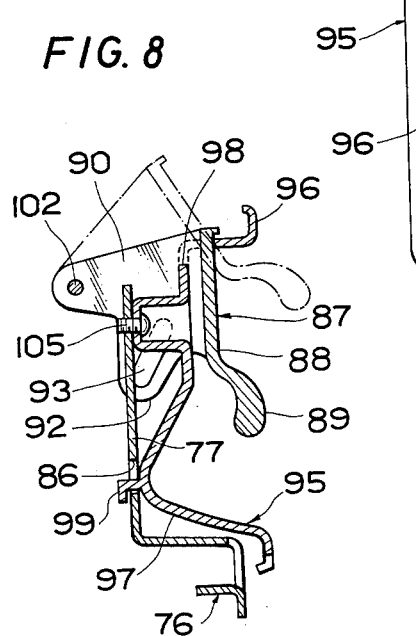
FIG. 8 is a sectional view taken along line 8—8 in FIG. 7.

Referring particularly to FIGS. 6 and 8, when operating part 89 is lifted as indicated by a chain line, lever 87 turns counterclockwise in the drawing about pin 102, and members 75 engaged with slots 93 of arms 90 are also lifted. Thereby, inner cables 74 are pulled to release the locking state of recliners 51 for adjusting the rising angle of rear seat back 43 or to lower the rear seat back down. When the operating part 89 is released, the state illustrated in solid line will be returned to by the tension of return spring 103 and inner cables 74.

By thus constructing the operating device and providing it in the upper middle part of the back surface of the rear seat back, the movement of rear seat back 43 may be performed by pulling lever 87, through the opened tail gate 28. Also, lever 87 may be pulled from the sitting space side by a person sitting on rear seat 41. Thus, the rear seat back can be easily operated from the front or the rear with simple operation. This is far more advantageous than the conventional operating device having actuating members provided on both sides of the rear seat with respect to space utilization, operability, and simplicity of the mechanism. Further, because the operating device of the invention pulls right and left control cables for equal distances to operate the recliners 51, the device can be constructed by bracket 76, lever 87, pin 102 and cover 95, thus reducing the number of components and simplifying the structure.

The preferred embodiment of the present invention has been described above with respect to the bench type of seat for convenience of explanation, but the invention can also be applied to a separating type of seat. In such case, the right and left seats will be supported in such a manner that portions at the center are supported in the same manner as the conventional means and the outer sides of the seats are supported according to the present invention.

We claim:

1. A rear seat apparatus for a car of the hatch-back type having a tail gate door arranged at an angle with respect to a vertical plane, said door being pivotally supported by and extending substantially rearwardly downwardly from a rear end portion of the roof panel of the car, comprising:

a rear seat back which normally substantially sections a sitting space and a luggage space of said car, which spaces communicate with each other;

said rear seat back being normally disposed such that said luggage space of said car is substantially triangular in vertical cross-section, said luggage space being defined substantially between said rear seat back, said tail gate door, and a rear floor portion of said car;

said rear seat back is normally substantially aligned with a line extending from said rear end portion of said roof panel of said car;

said rear seat back being provided with reclining means for adjusting the rising angle of said seat back so as to vary the capacity of said luggage space of said car;

said rear seat back being provided with means for operating said reclining means, said operating means being disposed in the upper central part on the back surface of said rear seat back;

right and left control cables disposed within said rear seat back, said control cables being operable by said operating means to lock and release said reclining means;

said operating means comprising a lever provided with receiving parts; and said apparatus further including:
  engaging members provided at tip ends of said control cables, said engaging members being adapted to be received by said receiving parts;
  a part to be pulled by the fingers of a user of said apparatus, said pulling part being integrally provided with said receiving parts; and
  bracket means pivotably supporting said lever and provided integrally with means for holding said control cables.

2. A rear seat apparatus according to claim 1, wherein:

said operating means further includes a cover adapted to shield said bracket and expose said lever on the back surface of said rear seat back.

3. A rear seat apparatus for a car having a sitting space and a luggage space, which spaces communicate with each other and are normally substantially sectioned by a rear seat back foldable to vary the capacity of the luggage space, wherein:

said seat back is provided with reclining means for adjusting the rising angle of said seat back;

said reclining means comprises brackets connected to the lower portions of side frame members of said seat back and recliners pivotably connected to said brackets;

said recliners are attached to rear wheel houses extending inwardly within the interior of said car;

said seat back is provided in the upper central part on the back surface thereof with means for operating said reclining means;

said seat back is further provided in the upper central part on the back surface thereof with means for operating said reclining means;

said seat back is further provided with a latching mechanism operatively connected with each of said recliners;

right and left control cables are disposed within said rear seat back and are operatively connected between said operating means and said latching mechanism, said control cables being operable by said operating means to lock and release each said recliner through said latching mechanism;

said operating means comprises a lever provided with receiving parts; and said apparatus further includes:
  engaging members provided at tip ends of said control cables, said engaging members being adapted to be received by said receiving parts;

a part to be pulled by the fingers of a user of said apparatus, said pulling part being integrally provided with said receiving parts; and bracket means pivotably supporting said lever and provided integrally with means for holding said control cables.

4. A rear seat apparatus according to claim 3, wherein:

said reclining means is adapted to adjust said seat back into a plurality of substantially locked positions, said positions including:

a rearwardly-inclined position;

a normal seat position;

at least one forwardly-inclined position wherein the capacity of said luggage space is enlarged relative to the normal capacity thereof; and a folded-down position wherein said sitting space and said luggage space are substantially combined into a single space.

5. A rear seat apparatus according to claim 2, wherein:

said reclining means is adapted to adjust said seat back into a plurality of substantially locked positions, said positions including:

a rearwardly-inclined position;

a normal seat position;

at least one forwardly-inclined position wherein the capacity of said luggage space is enlarged relative to the normal capacity thereof; and a folded-down position wherein said sitting space and said luggage space are substantially combined into a single space.

6. A rear seat apparatus for cars having a sitting space and a luggage space, which spaces communicate with each other and are normally substantially sectioned by a rear seat back foldable to vary the capacity of the luggage space, wherein:

said seat back is provided with reclining means for adjusting the rising angle of said seat back;

said seat back is provided with means for operating said reclining means;

said reclining means operating means is provided in the upper central part on the back surface of said rear seat back;

right and left control cables are disposed within said rear seat back, said control cables being operable by said operating means to lock and release said reclining means;

said operating means comprises a lever provided with receiving parts;

a part to be pulled by the fingers of a user of said apparatus is integrally provided with said receiving parts;

said control cables are provided with engaging members adapted to be received by said receiving parts;

said apparatus further includes bracket means pivotably supporting said lever and provided integrally with means for holding said control cables; and a cover is disposed so as to shield said bracket and expose said lever on the back surface of said rear seat back.

7. A rear seat apparatus according to claim 6, wherein:

said reclining means is adapted to adjust said seat back into a plurality of substantially locked positions, said positions including:

a rearwardly-inclined position;

a normal seat position;

at least one forwardly-inclined position wherein the capacity of said luggage space is enlarged relative to the normal capacity thereof; and a folded-down position wherein said sitting space and said luggage space are substantially combined into a single space.

8. A rear seat apparatus according to claim 7, wherein:

said reclining means comprises brackets connected to the lower portions of side frame members of said seat back and recliners pivotably connected to said brackets; and said recliners are attached to rear wheel houses extending inwardly within the interior of said car.

* * * * *